(No Model.)
W. J. WAYNE.
ROAD CART.
No. 352,593. Patented Nov. 16, 1886.
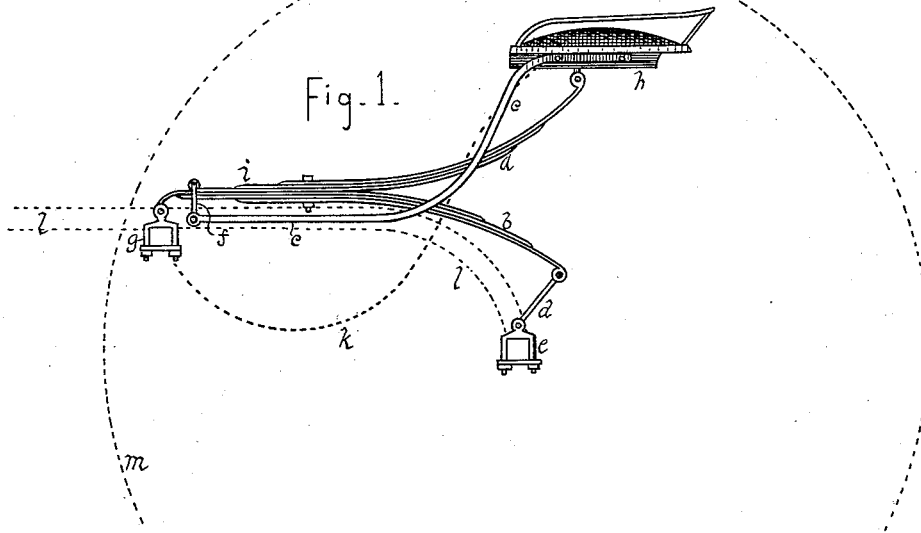
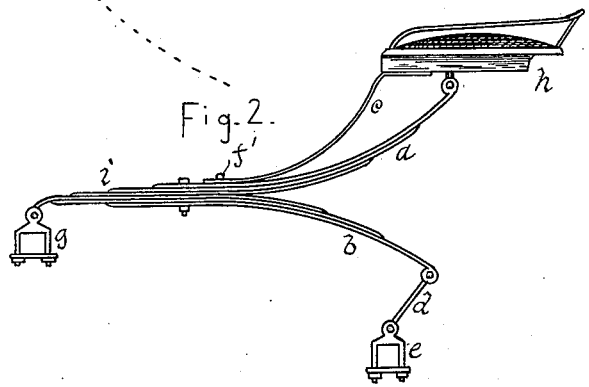
WITNESSES.
J. L. Booth,
H. W. Waggoner
INVENTOR.
W. J. Wayne.
By L. P. Graham
atty.

UNITED STATES PATENT OFFICE.

WILLIAM J. WAYNE, OF DECATUR, ILLINOIS.

ROAD-CART.

SPECIFICATION forming part of Letters Patent No. 352,593, dated November 16, 1886.

Application filed March 8, 1886. Serial No. 194,449. (No model.)

*To all whom it may concern:*

Be it known that I, WILLIAM J. WAYNE, a resident of the city of Decatur, county of Macon, and State of Illinois, have invented certain new and useful Improvements in Road-Carts, of which the following is a specification.

My invention relates to that class of road-carts in which a pair of springs at right angles with the axle support the seat at its opposite ends; and my object is to increase the elasticity of the springs while preserving the strength thereof, to enable the springs to conform to a variation in the weight of their load, and to thoroughly brace the seat in a manner permitting free operation of the springs.

My invention consists in certain details of construction and combination of parts, as hereinafter set forth and claimed, whereby the above-mentioned objects may be attained.

In the drawings accompanying and forming a part of this specification, Figure 1 is a side view of a spring and brace constructed in accordance with my invention, the seat and connecting-clips being represented in full lines, and the relative position of the shafts, foot-rest, and wheel being indicated by broken lines. Fig. 2 is a side view of the spring, seat, clips, and a modified form of brace.

$a$ is a seat-supporting spring, which, when in position in the cart, extends from an approximately-horizontal line upward and backward in a regular curve.

$b$ is a spring that joins tangentially with spring $a$, and when in operation has its rear end supported from the axle.

$c$ is a brace rigidly connected with the seat and having its extended end supported from the spring in a manner permitting free motion in the direction of its length.

$d$ is a swinging brace supporting the spring $b$ from the axle.

$e$ is a clip that fits on the axle and furnishes a pivotal bearing for support $d$.

$f$, Fig. 1, is a swinging support for brace $c$, and $f'$, Fig. 2, shows a sliding support for said brace, a longitudinal slot being provided, through which a bolt passes to hold the brace in contact with the spring and prevent lateral displacement.

$g$ is an eyebolt that connects the conjoined ends of the springs with the circle-bar of the shafts.

$h$ is the seat, provided with eyebolts that form pivotal connections for the supporting-springs.

$i$ represents a parallel extension of the conjoining springs.

The dotted lines $k$ indicate the contour and relative position of the foot-support.

Dotted lines $l$ indicate the position of the shafts with relation to the springs, and dotted line $m$ shows the position of the wheel's periphery.

A compound spring, as shown and described, is placed under each end of the seat, in the customary manner, and all connections with the springs are preferably pivotal.

The springs $a$ $b$ combine to strengthen in proportion to the weight imposed, portion $i$ becoming longer and elastic ends $a$ $b$ becoming shorter as the seat descends. A weight on the springs causes a relative elongation therein, owing to the diminution of their curvature, and this is compensated for by the swinging support $d$ and the longitudinally-movable seat-brace.

Under some circumstances it may be desirable to connect the springs immediately with the axle, and in this case elongation of the springs may be provided for in the connections of ends $i$, or in any suitable manner.

I claim as new and desire to secure by Letters Patent—

1. In road-carts, the combination, with the seat, the axle, and the circle-bar, of bifurcate springs, as $a$ $b$ $i$, having their integral ends pivotally connected with the circle-bar, and their bifurcations pivotally connected with the seat and axle, respectively, and inelastic braces rigidly attached to the seat and having their extending ends supported in a manner permitting motion in the direction of their lengths, as and for the purpose set forth.

2. In road-carts, the combination of bifurcate springs, as $a$ $b$ $i$, connected with the circle-bar and seat through the integral ends and upper bifurcations, respectively, and swinging supports, as $d$, interposed between the axle and the lower bifurcation, as and for the purpose set forth.

3. In road-carts, the combination of bifurcate springs, as *a b i*, pivotally connected with the circle-bar and seat through the integral ends and the upper bifurcations, respectively, supports, as *d*, interposed between the axle and lower bifurcations of the springs, and braces, as *c*, rigidly attached to the seat and having their extended ends supported in a manner permitting motion in the direction of their lengths.

WILLIAM J. WAYNE.

Witnesses:
C. C. CLARK,
L. P. GRAHAM.